United States Patent
Guering

(10) Patent No.: US 9,499,259 B2
(45) Date of Patent: Nov. 22, 2016

(54) LANDING GEAR FOR AN AIRCRAFT

(71) Applicant: AIRBUS OPERATIONS (SAS), Toulouse (FR)

(72) Inventor: Bernard Guering, Montrabe (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 32 days.

(21) Appl. No.: 14/577,041

(22) Filed: Dec. 19, 2014

(65) Prior Publication Data

US 2015/0175255 A1 Jun. 25, 2015

(30) Foreign Application Priority Data

Dec. 19, 2013 (FR) ...................... 13 62948

(51) Int. Cl.
| | | |
|---|---|---|
| *B64C 25/20* | (2006.01) | |
| *B64C 25/14* | (2006.01) | |
| *B64C 25/26* | (2006.01) | |

(52) U.S. Cl.
CPC .............. *B64C 25/20* (2013.01); *B64C 25/14* (2013.01); *B64C 25/26* (2013.01)

(58) Field of Classification Search
CPC ........... B65C 25/20; B65C 25/14; B65C 25/26
See application file for complete search history.

(56) References Cited

U.S. PATENT DOCUMENTS

| | | | | |
|---|---|---|---|---|
| 1,819,414 A | * | 8/1931 | Gruss ...................... | B64C 25/60 |
| | | | | 244/104 FP |
| 1,955,142 A | * | 4/1934 | Minshall ................. | B64C 25/10 |
| | | | | 244/104 R |
| 2,326,210 A | * | 8/1943 | Falk ........................ | B64C 25/02 |
| | | | | 244/104 R |
| 2,692,739 A | * | 10/1954 | Martin .................... | B64C 25/22 |
| | | | | 244/102 SL |
| 2,866,633 A | * | 12/1958 | Schnitzer ................ | F16F 9/486 |
| | | | | 188/289 |

(Continued)

FOREIGN PATENT DOCUMENTS

| | | |
|---|---|---|
| FR | 1 580 457 | 9/1969 |
| GB | 626 280 | 7/1949 |
| GB | 626280 | * 7/1949 |

OTHER PUBLICATIONS

French Preliminary Search Report dated Sep. 5, 2014, with English translation.

*Primary Examiner* — Justin Benedik

(74) *Attorney, Agent, or Firm* — Dickinson Wright PLLC

(57) ABSTRACT

A landing gear has a rigid structure and a gear compartment. A leg has a wheeled first end on a rolling shaft, and a second end secured on the rigid structure. The leg rotates between a rolling position, letting the aircraft rolls, and a landing gear storage position. A brace has a first end secured on the rigid structure. A guide bar has a first end pivotably secured on the leg, and a second end secured on the second end of the brace by a pivot shaft. A jack is secured between the brace by a pivot connection with a shaft parallel to the rolling shaft, and the guide bar, by a pivot connection with a shaft parallel to the rolling shaft. A locking system locks either a second end of the brace or the second end of the guide bar against the leg in the rolling position.

5 Claims, 2 Drawing Sheets

(56) References Cited

U.S. PATENT DOCUMENTS

| | | | | |
|---|---|---|---|---|
| 3,473,369 A | * | 10/1969 | Garrison | G01G 3/13 |
| | | | | 73/65.06 |
| 3,822,048 A | * | 7/1974 | Hartel | B64C 25/06 |
| | | | | 244/104 R |
| 3,826,450 A | * | 7/1974 | Currey | B64C 25/001 |
| | | | | 244/100 R |
| 4,405,119 A | * | 9/1983 | Masclet | B60G 15/12 |
| | | | | 188/288 |
| 2007/0108344 A1 | * | 5/2007 | Wood | B64C 7/00 |
| | | | | 244/102 R |
| 2009/0176078 A1 | * | 7/2009 | Seror | B64C 25/001 |
| | | | | 428/218 |
| 2010/0017052 A1 | * | 1/2010 | Luce | G01M 3/3245 |
| | | | | 701/16 |

\* cited by examiner

LANDING GEAR FOR AN AIRCRAFT

CROSS REFERENCE TO RELATED APPLICATION

This application is entitled to and claims the benefit of French Application No. 1362948 filed Dec. 19, 2013, the disclosure of which, including the specification, claims, drawings and abstract, are incorporated herein by reference in their entirety.

FIELD

The present invention relates to a landing gear for aircraft, as well as to an aircraft comprising at least one such landing gear.

BACKGROUND

An aircraft comprises at least one landing gear which is mobile between a rolling position, which makes it possible to ensure rolling on a runway during landing or take-off, and a storage position in which the landing gear is enclosed in a gear compartment when the aircraft is in flight.

Such a landing gear conventionally comprises a leg at the end of which there is secured, by means of a shock-absorption system, at least one wheel which is mobile in rotation around a rolling shaft.

In order to ensure the rigidity of the leg in the rolling position, the landing gear comprises a brace which is interposed between the leg and the structure of the aircraft.

Putting such a brace into place makes it necessary to provide a volume in the gear compartment which is sufficient for the leg and the brace to be accommodated in it during flight.

So-called thrust braces are known, which are arranged at the rear of the leg, and thus exert a thrust force on the leg, in order to compensate for the force sustained by the said leg.

The dimensions of such a thrust brace are relatively large, which makes it necessary to increase the volume available in the interior of the gear compartment, to the detriment of other volumes of the aircraft.

The document GB-A-626 280 and the document FR-A-1 580 457 disclose landing gears for aircraft. In these landing gears, the position of the cylinder is such that the latter encumbers the landing gear compartment.

SUMMARY

An objective of the present invention is to propose a landing gear, the volume of which in the storage position is reduced.

For this purpose, a landing gear for an aircraft is proposed, which has a rigid structure and a gear compartment, the landing gear comprising:
- a leg with a first end, on which there is secured at least one wheel which is mobile in rotation around a rolling shaft, and a second end which is designed to be secured on the rigid structure by means of a pivot connection with a shaft parallel to the rolling shaft, the leg being mobile in rotation between a rolling position, in which the leg and the wheel ensure that the aircraft rolls, and a storage position in which the landing gear is accommodated in the gear compartment;
- a brace with a first end which is designed to be secured on the rigid structure by means of a pivot connection with a shaft parallel to the rolling shaft, and a second end;
- a guide bar with a first end secured on the leg by means of a pivot connection with a shaft parallel to the rolling shaft, and a second end secured on the second end of the brace by means of a pivot connection with a shaft parallel to the rolling shaft;
- a jack secured between the brace, by means of a pivot connection with a shaft parallel to the rolling shaft, and the guide bar, by means of a pivot connection with a shaft parallel to the rolling shaft; and
- a locking system which is designed to lock at least one out of the second end of the brace, or the second end of the guide bar, against the leg, when the leg is in the rolling position.

Such a landing gear makes it possible to produce a brace which is rigid in the rolling position, and articulated during maneuvering and storage of the landing gear, and thus permits reduction of the dimensions necessary to accommodate the landing gear in the storage position.

BRIEF DESCRIPTION OF DRAWINGS

Furthermore, the position of the cylinder in this landing gear leaves clear the environment in the vicinity of the landing gear compartment and simplifies it. Furthermore the position of the cylinder makes it possible, using a very small thrust, to obtain a large movement, which makes it possible to store the landing gear at a higher level and to be able to position it closer to the nose of the aircraft and to provide novel configurations.

The aforementioned characteristics of the invention, as well as others, will become more apparent from reading the following description of an embodiment, the said description being provided in relation with the appended drawings, in which.

DETAILED DESCRIPTION OF EMBODIMENTS

Figure 1:
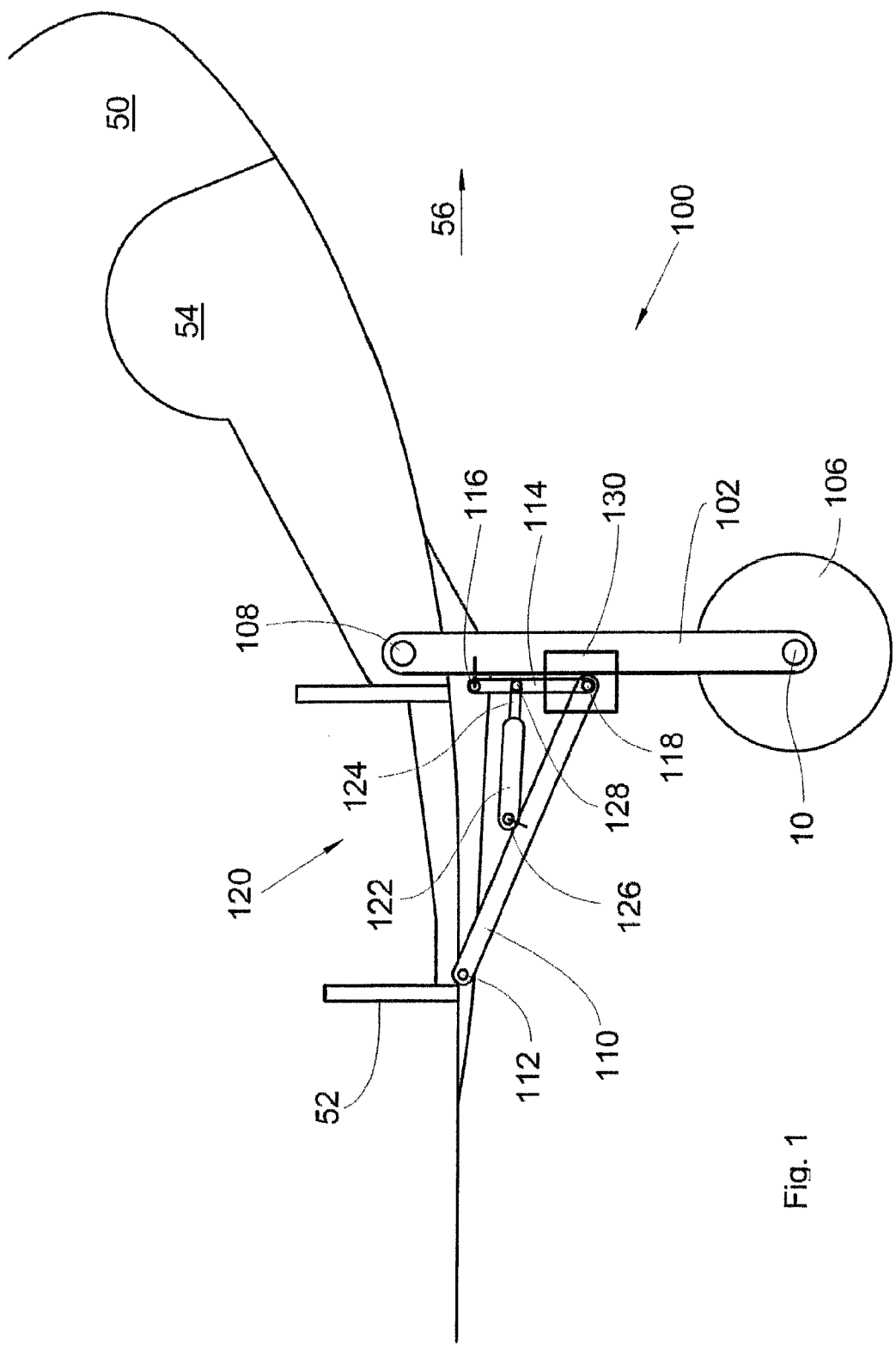
FIG. 1 is a lateral schematic representation of a landing gear according to the invention equipping an aircraft, and in the rolling position.
Figure 2:
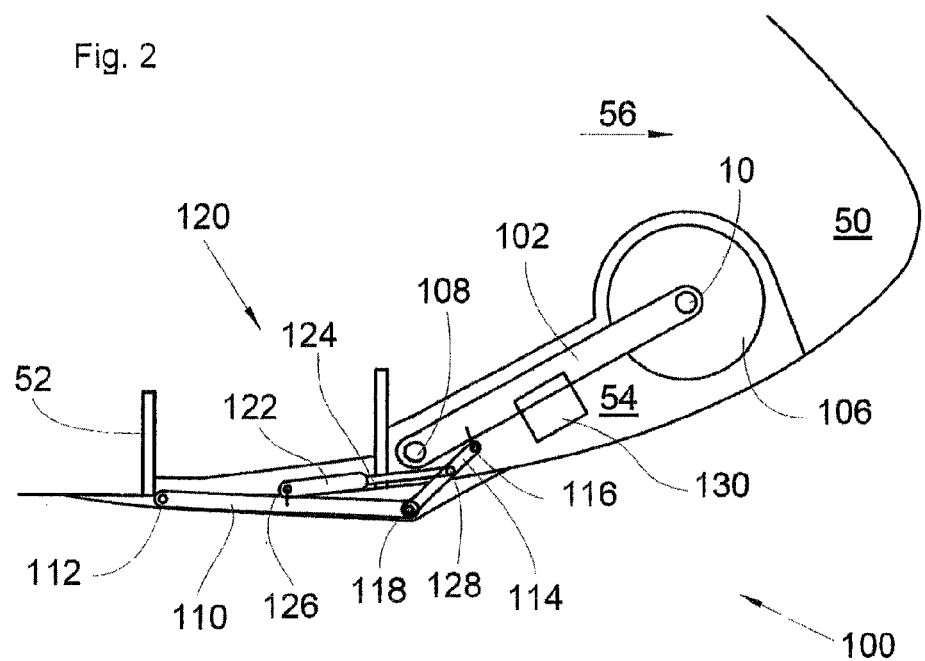
FIG. 2 is a lateral schematic representation of the landing gear in FIG. 1 in the storage position.
Figure 3:
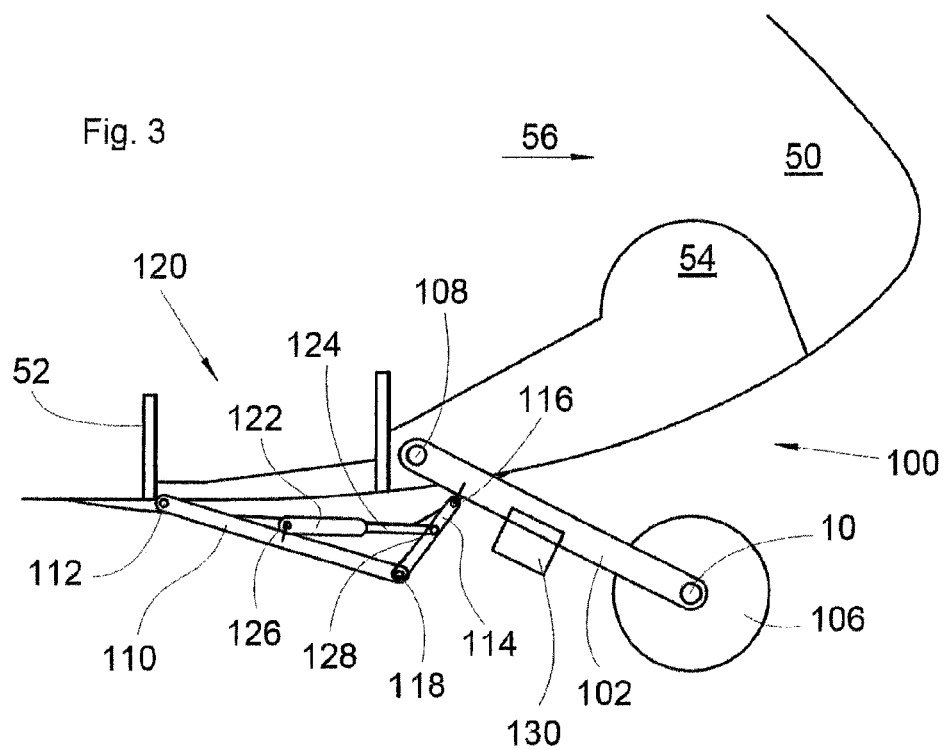
FIG. 3 is a lateral schematic representation of the landing gear in FIG. 1 in an intermediate position, between the rolling position and the storage position.

FIGS. 1 to 3 show a landing gear 100 which is mounted at the front of an aircraft 50 comprising a rigid structure 52 on which there is secured the landing gear 100 and a gear compartment 54 which constitutes an empty volume in the interior of the rigid structure 52.

The landing gear 100 comprises a leg 102 on which there is secured a wheel 106 which is mobile in rotation around a rolling axis 10. The leg 102 is mobile in rotation between the rolling position, in which the landing gear 100, and more particularly the leg 102 and the wheel 106, are arranged such as to ensure that the aircraft 50 rolls on a runway when landing or taking off, and the storage position in which the landing gear 100 is accommodated in the gear compartment 54 when the aircraft 50 is in flight.

The aircraft 50 advances according to a direction of advance 56.

The landing gear 100 comprises:
the leg 102, with a first end to which the wheel 106 is secured, and a second end which is secured on the rigid structure 52 by means of a pivot connection 108 with a shaft parallel to the rolling axis 10;

a brace 110 with a first end secured on the rigid structure 52 by means of a pivot connection 112 with a shaft parallel to the rolling axis 10, and a second end;

a guide bar 114 with a first end secured on the leg 102 by means of a pivot connection 116 with a shaft parallel to the rolling axis 10, and a second end secured on the second end of the brace 110 by means of a pivot connection 118 with a shaft parallel to the rolling axis 10;

a jack 120 with a body 122 and a rod 124 which is mobile in translation relative to the body 122 according to a direction parallel to the shaft of the rod 124, the body 122 being secured on the brace 110 by means of a pivot connection 126 with a shaft parallel to the rolling axis 10, and the rod 124 being secured on the guide bar 114 by means of a pivot connection 128 with a shaft parallel to the rolling axis 10; and a locking system 130 which is integral with the leg 102, and is designed to lock at least one out of the second end of the brace 110 or the second end of the guide bar 114 against the leg 102, only when the leg 102 is in the rolling position.

The rod 124 is mobile alternatively between a deployed position (FIG. 2) in which its extension from the body 122 is maximum, and wherein it positions the landing gear 100 in the storage position, and a retracted position (FIG. 1) in which its extension from the body 122 is minimum, and wherein it positions the landing gear 100 in the rolling position.

The displacement of the rod 124 is controlled by a control system of the aircraft 50.

When the landing gear 100 is not in the rolling position, the locking system 130 is separated from the brace 110 and the guide bar 114.

The locking system 130 ensures the retention of the brace 110 and thus the rigidity of the leg 102.

The separation of the second end of the brace 110 and the leg 102, and putting the articulated guide bar 114 into place on the brace 110, make it possible to constitute an articulated assembly which can thus be rolled around the axis of rotation of the leg 102, and therefore permit a reduction in the dimensions necessary to accommodate the landing gear 100 in the storage position. The volume of the gear compartment 54 can thus be reduced.

In addition, the angle of elevation of the leg 102 can be greater than in the case of the landing gears according to the prior art.

The length of the lever arm of the brace 110 is thus increased during the maneuvering of the landing gear 100, although its length remains limited in the rolling position, thereby ensuring good mechanical efficiency.

The jack 120 ensures the control of the brace 110 and the maneuvering of the landing gear 100.

The structure of the gear compartment 54 is not subjected to any force derived from the landing gear 100, and it is therefore subjected only to the forces caused by the pressurization. The structure of the gear compartment 54 can thus be lightened, and this makes it possible to simplify the production of the nose cone of the aircraft 50.

The jack 120 can also be mounted inversely, i.e. the body 122 is secured on the guide bar 114, and the rod 124 is secured on the brace 110.

In FIGS. 1 to 3, a single wheel 106 is represented, but the invention applies in the same manner if the landing gear 100 comprises a plurality of wheels.

Similarly, in FIGS. 1 to 3, the wheel 106 is secured directly on the leg 102, but it is preferably mounted by means of a shock-absorption system.

The rotation of the leg 102 between the rolling position and the storage position takes place around the pivot connection 108, between the second end of the leg 102 and the rigid structure 52.

The pivot connection 112 which connects the brace 110 and the rigid structure 52 is at the rear of the leg 102 relative to the direction of advance 56.

The guide bar 114 and the jack 120 are at the rear of the leg 102 relative to the direction of advance 56, and thus at the rear of the leg 102 relative to the direction of displacement of the leg 102 during its passage from the rolling position to the storage position.

The first end of the guide bar 114 is secured on the leg 102 at a higher position than the position of the second end of the guide bar 114, when the leg 102 is in the rolling position.

In the rolling position, the guide bar 114 is substantially parallel to the leg 102.

The pivot connection 128 between the rod 124 and the guide bar 114 is situated between the first end and the second end of the guide bar 114.

The pivot connection 126 between the jack 120 and the brace 110 is situated between the first end and the second end of the brace 110.

Starting from the rolling position, when the landing gear 100 must be retracted, the locking system 130 is unlocked in order to be separated from the brace 110 and the guide bar 114, then the rod 124 is deployed, and thrusts the guide bar 114, which tends to thrust back the first end of the guide bar 114, and thus the leg 102, which pivots around the pivot connection 108 of its second end, until it returns the landing gear 100 into the gear compartment 564.

The inverse manipulation permits the return of the landing gear 100 to the rolling position.

The locking system 130 thus comprises a locking position in which it locks at least one out of the second end of the brace 110 or the second end of the guide bar 114 against the leg 102, and a position in which the second end of the brace 110 and the second end of the guide bar 114 are free to be displaced relative to the leg 102.

The locking system 130 is divided into a part which is integral with the leg 102 and a part which is integral with the end to be locked, and a locking mechanism which locks the two parts to one another in order to ensure the rigidity of the brace 110.

The locking system 130 can comprise for example a hook which is mounted on the leg 102, and a shaft which is mounted on the brace 110 or the guide bar 114, and a control which displaces the hook such that it encircles the shaft in order to lock it. The control is generally hydraulic, but can also be of another type such as electric or mechanical.

The invention claimed is:

1. A landing gear for an aircraft, with a rigid structure and a gear compartment, the landing gear comprising:
    a leg with a first end, on which there is secured at least one wheel which is mobile in rotation around a rolling shaft, and a second end which is structured to be secured on the rigid structure by a pivot connection with a shaft parallel to the rolling shaft, the leg being mobile in rotation between a rolling position, in which the leg and the wheel ensure that the aircraft rolls, and a storage position in which the landing gear is accommodated in the gear compartment;

- a brace with a first end which is structured to be secured on the rigid structure by a pivot connection with a shaft parallel to the rolling shaft, and a second end;
- a guide bar with a first end secured on the leg by a pivot connection with a shaft parallel to the rolling shaft, and a second end secured on the second end of the brace by a pivot connection with a shaft parallel to the rolling shaft;
- a jack secured between the brace, by a pivot connection with a shaft parallel to the rolling shaft, and the guide bar, by a pivot connection with a shaft parallel to the rolling shaft; and
- a locking system which is structured to lock at least one of the second end of the brace, or the second end of the guide bar, against the leg, when the leg is in the rolling position.

2. The landing gear gear according to claim 1, characterized in that the guide bar and the jack are at the rear of the leg relative to the direction of displacement of the leg during its passage from the rolling position to the storage position.

3. The landing gear gear according to claim 2, characterized in that the first end of the guide bar is secured on the leg at a higher position than the position of the second end of the guide bar, when the leg is in the rolling position.

4. The landing gear according to claim 3, characterized in that, in the rolling position, the guide bar is substantially parallel to the leg.

5. An aircraft comprising a rigid structure, a gear compartment and a landing gear according to claim 1.

* * * * *